(12) United States Patent
Khitrov et al.

(10) Patent No.: US 8,515,220 B1
(45) Date of Patent: Aug. 20, 2013

(54) OPTICAL FIBER COUPLER FOR COUPLING SIGNAL BEAMS INTO A NON-CIRCULARLY SHAPED OPTICAL BEAM

(75) Inventors: Victor Khitrov, Redondo Beach, CA (US); David A. Rockwell, Culver City, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/445,404

(22) Filed: Apr. 12, 2012

(51) Int. Cl.
G02B 6/12 (2006.01)
G02B 6/26 (2006.01)
G02B 6/00 (2006.01)
G02B 6/42 (2006.01)

(52) U.S. Cl.
USPC ............................................. 385/14; 385/43

(58) Field of Classification Search
USPC ................................. 385/14, 15, 16, 37, 147, 43
See application file for complete search history.

(56) References Cited

U.S. PATENT DOCUMENTS

| 4,076,378 | A * | 2/1978 | Cole ............................... 385/115 |
|---|---|---|---|
| 5,155,790 | A | 10/1992 | Hwang |
| 5,442,723 | A * | 8/1995 | Vinchant et al. .............. 385/129 |
| 6,103,535 | A * | 8/2000 | Pilevar et al. .................. 436/518 |
| 6,324,326 | B1 * | 11/2001 | Dejneka et al. ................ 385/123 |
| 6,558,958 | B1 * | 5/2003 | Pilevar et al. .................. 436/518 |
| 6,944,192 | B2 * | 9/2005 | Prassas et al. ...................... 372/6 |
| 7,539,377 | B2 * | 5/2009 | Gonthier ........................... 385/39 |
| 8,027,556 | B2 * | 9/2011 | Tokushima ........................ 385/39 |
| 8,085,464 | B2 * | 12/2011 | Gonthier et al. ............. 359/341.3 |
| 2004/0165827 | A1 | 8/2004 | Bruesselbach et al. |
| 2010/0189138 | A1 | 7/2010 | Shkurikhin et al. |
| 2011/0280517 | A1 | 11/2011 | Fini et al. |
| 2012/0127563 | A1 * | 5/2012 | Farmer et al. ............... 359/341.3 |
| 2012/0190928 | A1 * | 7/2012 | Boudoux et al. .............. 600/166 |
| 2012/0219026 | A1 * | 8/2012 | Saracco et al. .................. 372/21 |

FOREIGN PATENT DOCUMENTS

| DE | 102008023968 A1 | 12/2009 |
|---|---|---|
| GB | 2228097 A | 8/1990 |
| JP | 2004193267 A | 7/2004 |
| WO | 2007015577 A1 | 2/2007 |

* cited by examiner

*Primary Examiner* — Akm Enayet Ullah
(74) *Attorney, Agent, or Firm* — Pierce Atwood LLP; Joseph M. Maraia (57) ABSTRACT

An optical fiber coupler configured to couple signal beams into a non-circularly shaped output optical beam or device is provided. The coupler includes an adiabatically tapered optical device. The tapered optical device has a core taper ratio equal to the ratio between a second core diameter and a first core diameter and a mode taper ratio equal to the ratio between a second mode field diameter and a first mode field diameter. The mode taper ratio is greater than the core taper ratio. A spacing between adjacent cores at the output end is less than a spacing between adjacent cores at the input end by approximately the core taper ratio, thereby increasing brightness of a combined output optical signal relative to the combined brightness of the plurality of input optical fibers by approximately a factor equal to the ratio of the mode taper ratio to the core taper ratio.

31 Claims, 8 Drawing Sheets

OPTICAL FIBER COUPLER FOR COUPLING SIGNAL BEAMS INTO A NON-CIRCULARLY SHAPED OPTICAL BEAM

BACKGROUND

The present disclosure relates to an optical fiber coupler configured to couple signal beams from a plurality of input optical fibers into a non-circularly shaped output optical beam.

High-aspect ratio core (HARC) optical fibers are generally used for lasers and laser beam delivery applications. The HARC fiber has a characteristic feature: in one direction the beam traveling through the HARC fiber has close to diffraction-limited beam quality, and in the perpendicular direction the beam has either a multi-mode quality or also close to diffraction-limited beam quality, depending on the design of particular fiber.

Figure 1:
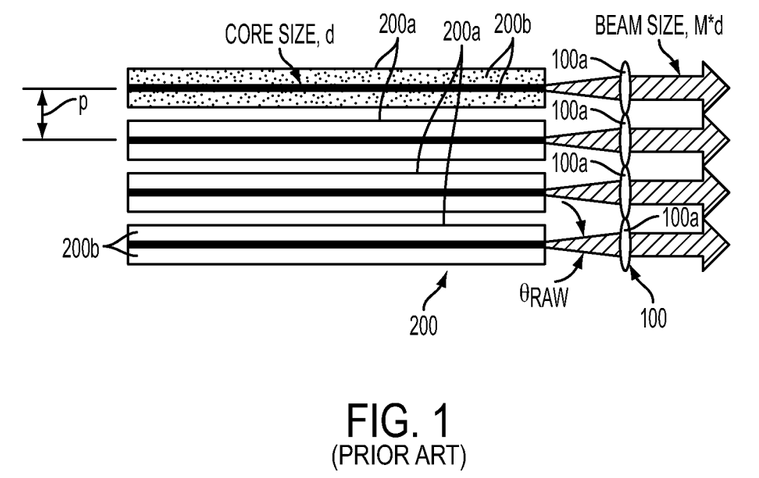
FIG. 1 illustrates a conventional system for increasing the brightness of a fiber array by using a micro-lens array.

FIG. 1 shows a conventional arrangement that is configured to increase the brightness of a fiber array. As shown in FIG. 1, micro-lens array 100 is positioned near a linear array of fibers 200 to eliminate the spacing between fibers 200a of array 200 and thereby to increase the brightness of fiber array 200. An array of lenses 100 is configured to optically remove the space taken up by claddings 200b, thereby to form an optical equivalent of an array of cores without the claddings.

In the arrangement shown in FIG. 1, the center-to-center spacing between fibers 200a is represented as pitch p, the core size of each fiber 200a is represented as d, the raw beam divergence is represented as $\theta_{raw}$, and the magnification is represented as M.

As shown in FIG. 1, fibers 200a are aligned with their exit facets in a single plane, and lens array 100 is positioned away from fibers 200a at a distance that is equal to the focal length of the lenses. The beams propagating through lenses 100a are parallel to each other. If the lens apertures are designed to properly account for magnification M, the resulting output beams may have quite small spacings between them corresponding to an increased brightness relative to that of the initial fiber array 200.

The approach shown and described with respect to FIG. 1 suffers from a number of challenges relating to optical fabrication and positioning tolerances, which will affect the final collimation and parallelism of the output beams.

In another approach designed to improve the brightness of fiber array 200, an array of quarter-pitch Gradient Index (GRIN) lenses (not shown) may be used instead of micro-lens array 100 of FIG. 1. The array of quarter-pitch GRIN lenses may be fused between the individual input fibers and the HARC output fiber (not shown). However, this approach, like the approach described with respect to FIG. 1, does not cure the problems of optical fabrication and positioning tolerances.

Applicant has identified a need for an all-fiber device that is capable of coupling optical signal(s) from a number of fiber-coupled devices into a non-circularly shaped output optical beam which can be coupled into the device with non-circularly shaped waveguide (e.g., HARC fiber, planar waveguide, etc) or can be used as a free-space beam. Such an all-fiber coupler device needs to maintain the beam quality while improving brightness.

SUMMARY

One embodiment relates to an optical fiber coupler configured to receive signal beams from a plurality of input optical fibers and to produce a non-circularly shaped output optical beam. The coupler includes an adiabatically tapered optical device. The adiabatically tapered optical device has one or more cores with a first core diameter, one or more claddings, and a first mode field diameter at an input end of the tapered optical device, and a second core diameter and a second mode field diameter at an output end of the tapered optical device. The tapered optical device has a core taper ratio equal to the ratio between the second core diameter and the first core diameter and a mode taper ratio equal to the ratio between the second mode field diameter and the first mode field diameter. The tapered optical device is configured to be directly attached to the plurality of input optical fibers at the input end and to produce the non-circularly shaped output beam at the output end. The mode taper ratio is greater than the core taper ratio, while a spacing between adjacent cores at the output end is less than a spacing between adjacent cores at the input end of the tapered optical device by approximately the core taper ratio thereby increasing brightness of a combined output optical signal relative to the combined brightness of the plurality of input optical fibers by approximately a factor equal to the ratio of the mode taper ratio to the core taper ratio.

Another embodiment relates to an optical fiber coupler configured to couple signal beams from a plurality of input optical fibers into a non-circularly shaped output optical device. The coupler includes an adiabatically tapered optical device. The adiabatically tapered optical device has one or more cores with a first core diameter, one or more claddings, and a first mode field diameter at an input end of the tapered optical device, and a second core diameter and a second mode field diameter at an output end of the tapered optical device. The tapered optical device has a core taper ratio equal to the ratio between the second core diameter and the first core diameter and a mode taper ratio equal to the ratio between the second mode field diameter and the first mode field diameter. The tapered optical device is configured to be directly attached to the plurality of input optical fibers at the input end and to the non-circularly shaped output device at the output end. The mode taper ratio is greater than the core taper ratio, while a spacing between adjacent cores at the output end is less than a spacing between adjacent cores at the input end of the tapered optical device by approximately the core taper ratio thereby increasing brightness of a combined output optical signal relative to the combined brightness of the plurality of input optical fibers by approximately a factor equal to the ratio of the mode taper ratio to the core taper ratio.

These and other aspects of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one example of the present disclosure, the structural components illustrated herein can be considered drawn to scale. It is to be expressly understood, however, that many other configurations are possible and that the drawings are for the purpose of example, illustration and description only and are not intended as a definition or to limit the scope of the present disclosure. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

Figure 2A:
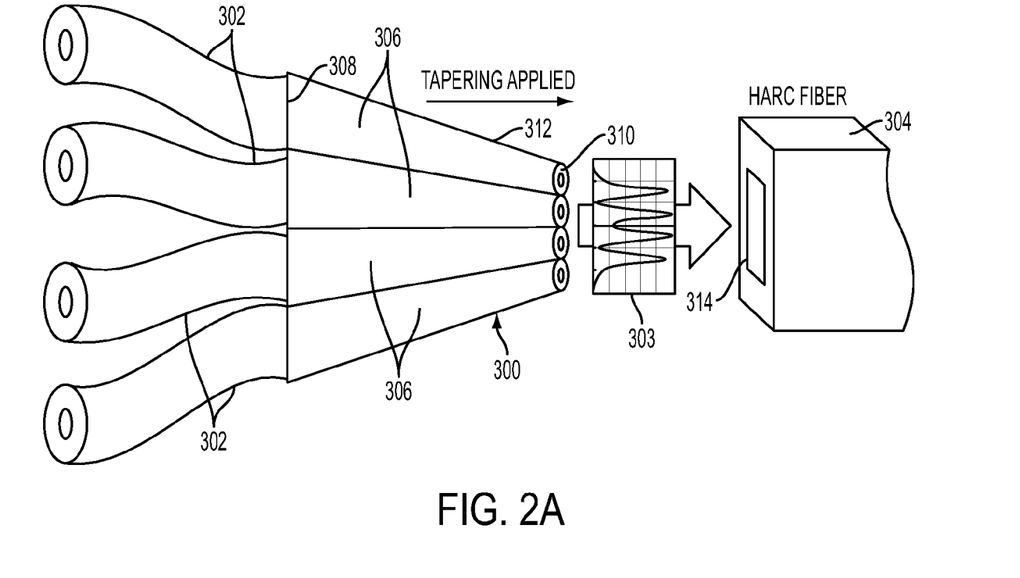
FIG. 2A illustrates an optical fiber coupler configured to couple signal beams from a plurality of input optical fibers into a non-circularly shaped output optical beam in accordance with an embodiment of the present disclosure.

FIG. 2A shows optical fiber coupler 300 configured to couple signal beams from a plurality of input optical fibers 302 into non-circularly shaped output optical device 304 in accordance with an embodiment of the present disclosure. Optical fiber coupler 300 has an all-fiber architecture without any free space optics. Such an all-fiber coupler device is configured to maintain the beam quality while improving brightness.

In one embodiment, the all-fiber optical coupler 300 of the present application is capable of receiving optical signal(s) from the plurality of input optical fibers 302 to produce a non-circularly shaped output optical beam 303. In such an embodiment, the non-circularly shaped output optical beam 303 may be used as a free-space beam or may be further coupled into a device (e.g., 304) with a non-circularly shaped waveguide (e.g., a HARC fiber, a planar waveguide, a non-circularly shaped waveguide, etc.).

In another embodiment, the all-fiber optical coupler 300 of the present application is capable of coupling optical signal(s) from the plurality of input optical fibers 302 into a non-circularly shaped output optical device 304 (e.g., a HARC fiber, a planar waveguide, a non-circularly shaped waveguide, etc.).

Coupler 300 includes adiabatically tapered optical device 312. In one embodiment, as will be described in detail below, adiabatically tapered optical device 312 includes an adiabatically tapered multi-core waveguide. In another embodiment, as will be described in detail below and as shown in FIG. 2A, adiabatically tapered optical device 312 includes an array of adiabatically tapered optical fibers 306.

Adiabatic tapering generally refers to a gradual tapering of the optical fibers or the waveguide with low or no signal loss. Adiabatic tapering of optical fibers is described in detail, for example, in Timothy A. Birks and Youwei W. Li, entitled "The Shape Of Fiber Tapers," Journal Of Lightwave Technology, Volume 10, No. 4, April 1992; and J. D. Love, W. M. Henry, W. J. Stewart, R. J. Black, S. Lacroix, and F. Gonthier, entitled "Tapered Single-mode Fibers And Devices," IEE Proceedings-J, Volume. 138, No. 5, October 1991, each of these is incorporated herein by reference in its entirety.

Adiabatically tapered optical device 312 is configured to minimize the signal losses while preserving a beam quality of optical device 312. The adiabatic tapering also increases the fill factor at input end 308 of coupler 300 and increases the brightness of optical device 312 with low signal losses.

Adiabatically tapered optical device 312 has one or more cores with a first core diameter, one or more claddings, and a first Mode Field Diameter (MFD) at input end 308 of the tapered optical device, and has a second core diameter and a second MFD at output end 310 of the tapered optical device.

Core diameter generally refers to the diameter of the core of the optical fiber. Mode Field Diameter (MFD) generally takes into account the spatial extent of the fundamental mode. That is, when light travels through an optical fiber, although most light travels in the core of the optical fiber, some light spreads into at least a portion of the cladding of the optical fiber. The diameter of this circular area through which light propagates in the optical fiber is called the fiber's mode field diameter or MFD.

Adiabatically tapered optical device 312 has a core taper ratio equal to the ratio between the second core diameter and the first core diameter and has a mode taper ratio equal to the ratio between the second MFD and the first MFD. The mode taper ratio is greater than the core taper ratio. In one embodiment, the core taper ratio is less than 1.

In one embodiment, the mode taper ratio is substantially unity, such that the fiber cores at input and output ends 308 and 310 of adiabatically tapered optical device 312 produce substantially the same or different mode field diameter. In one embodiment, as described in detail below, fibers 306 of the array 312 may be just positioned and stacked (lined) up together.

A spacing between adjacent cores at output end 310 of the tapered optical device is less than a spacing between adjacent cores at the input end 308 of the tapered optical device by the core taper ratio, thereby increasing the brightness of a combined output optical signal relative to the combined brightness of the plurality of input optical fibers 302 by a factor approximately equal to the ratio of the mode taper ratio to the core taper ratio (or less).

Brightness is generally referred to as optical power per unit area per unit solid angle. Coupler 300 is configured to increase the brightness of the output beam by maintaining the total power and brightness of each beam (i.e., solid angle of combined output beam), while bringing the beams closer together thereby reducing the total area from which the light is emitted (i.e. the core area of the output fiber). The specific taper used in this present disclosure produces an array of output beams, each of which has the same or different mode field diameter and beam divergence as each of the individual input fibers (i.e., brightness of each individual tapered fiber is preserved), but the beams are contained within a total area that is less than the sum of the areas of the individual input fibers if they were packed as closely as possible next to each other.

In one embodiment, a cross-sectional area of tapered optical device 312 at output end 310 is designed to essentially match input area 314 of non-circularly shaped core output optical device 304, thereby enabling the coupling of the signal beams from plurality of input optical fibers 302 to non-circularly shaped core output optical device 304.

In another embodiment, a cross-sectional area of beam 303 (at an end opposite to that of the coupler) is designed to essentially match input area 314 of non-circularly shaped output optical device 304, thereby enabling the coupling of the signal beams from beam 303 to non-circularly shaped output optical device 304.

In another embodiment, a cross-sectional area of tapered optical device 312 at output end 310 is designed to essentially match an intended or a desired area of non-circularly shaped core output optical beam 303.

That is, fibers 306 of coupler 300 are arranged in a way to match an acceptance area of a non-circularly shaped core output optical device that receives the optical signal from coupler 300. For example, fibers 306 of coupler 300 may be arranged as a linear ribbon array or some other arrangement. Also, fibers 306 of coupler 300 of the present disclosure need to match fiber-coupled signal sources 302. The parameters of fibers 306 depend on input signal fibers 302 and on particular non-circularly shaped core output optical device 304 being used. In another embodiment, the parameters of fibers 306 depend on input signal fibers 302 and on particular non-circularly shaped core output optical beam 303 being produced.

In one embodiment, array 312 of optical fibers 306 is a linear array. In another embodiment, array 312 of optical fibers 306 is an array having a shape that differs from linear. In one embodiment, a N×1 linear array, a N×M array or some other arrangement is used to match a required output beam shape. In the illustrated embodiment, as shown in FIG. 2A, a 4×1 linear array is used to match a required output beam shape.

In one embodiment, optical fibers 306 of coupler 300 are lined up in a linear array and are adiabatically tapered by a factor of four. That is, the tapering ratio of coupler 300 may be four. In other embodiments, the tapering ratio used in coupler 300 may vary. The tapering ratio may be chosen to specifically match input and output beam dimensions and/or layout.

Figure 11:
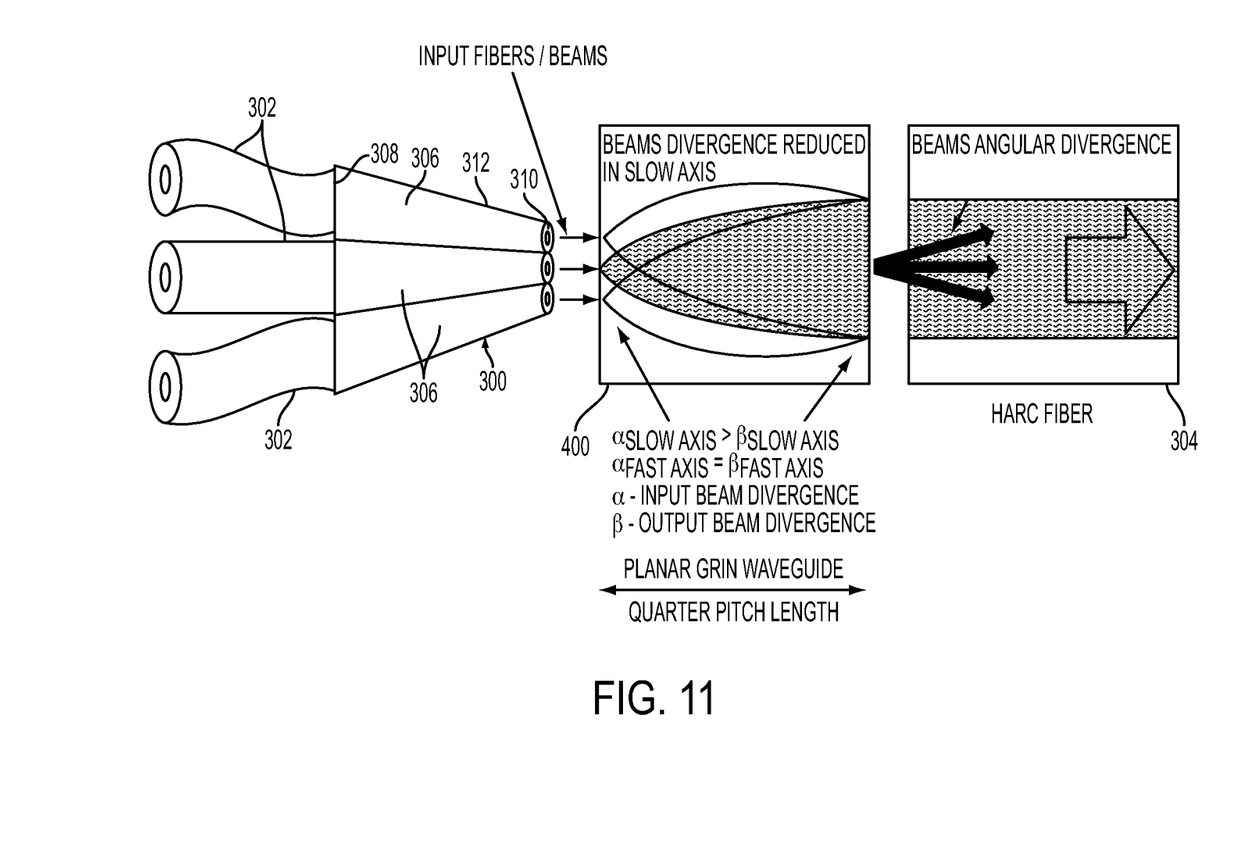

Output beam from tapered fibers 306 of coupler 300 may need to have different numerical apertures in the wide (slow-axis) and narrow (fast-axis) directions (such as HARC fiber). As shown in FIG. 11, a planar GRIN waveguide 400 may be used to change the numerical aperture in one axis. Using a planar GRIN waveguide in an all-fiber device for changing the numerical aperture in one axis is described in detail, for example, in U.S. Pat. No. 7,860,360, hereby incorporated by reference in its entirety, and hence will not be explained in detail here.

FIG. 11 shows exemplary Planar GRIN waveguide 400 disposed between output end 310 of array 312 and non-circularly shaped core output optical device 304 to match signals from tapered optical device 312 to a core size and a numerical aperture of non-circularly shaped core output optical device 304. The GRIN waveguide 400 does not increase input beam brightness. In one embodiment, a quarter-pitch length GRIN waveguide may be used. In other embodiments, other GRIN waveguide lengths may also be used.

In the illustrated embodiment of FIG. 2A, exemplary optical fiber coupler 300 with four separate input optical fibers 302 having circular cores is shown. Optical fiber coupler 300 is capable of coupling signals from input optical fibers 302 into HARC fiber 304.

In one embodiment, tapered optical device 312 of coupler 300 is configured to be directly attached to plurality of input optical fibers 302 at input end 308 and to non-circularly shaped core output optical beam or device 304 at output end 310.

In another embodiment, tapered optical device 312 of coupler 300 is configured to be directly attached to plurality of input optical fibers 302 at input end 308 and to produce non-circularly shaped core output optical beam 304 at output end 310.

Figure 2B:
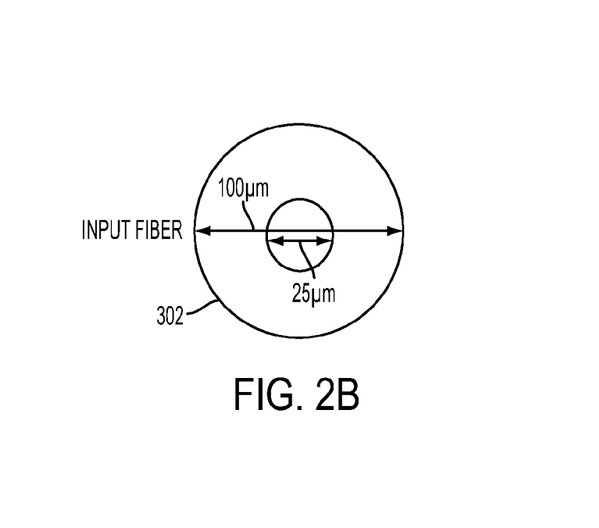
FIG. 2B illustrates a cross-sectional view of an input optical fiber in accordance with an embodiment of the present disclosure.

In one embodiment, input optical fiber 302 has a circular core with diameter of 25 micrometers (μm) and a numerical aperture of 0.06. The cross-sectional view of exemplary input optical fiber 302 is shown in FIG. 2B. As shown in FIG. 2B, input optical fiber 302 has a core diameter of 25 μm and a cladding diameter of 100 μm.

For example, a 25 μm 0.06NA core input optical fiber is widely used for multi-kW lasers with diffraction limited beams. The 25 μm 0.06NA core input optical fiber is commercially available on the market and manufactured by conventional techniques, and is used for high laser power delivery. The 25 μm 0.06NA core input optical fiber supports four transverse modes, but only the fundamental mode ($LP_{01}$) is excited in diffraction limited lasers. In one embodiment, coupler 300 considers only a fundamental mode.

In one embodiment, input end 308 of coupler 300 is connected to any matching fiber, for example, a 25 μm 0.06NA core and 400 μm cladding optical fiber typically used in high power fiber lasers with diffraction-limited beams. Array 312 of coupler 300 is directly attached to plurality of input optical fibers 302 by bonding, gluing, using a bulkhead connector, or fusion splicing to array 312.

In an illustrated embodiment, optical fiber coupler 300 includes four adiabatically tapered optical fibers 306. Coupler 300 may be made of a fused silica material, which is a material preferable for lasers in the Near Infrared (NIR) region. In other embodiments, coupler 300 may be made from any other suitable optical material as would be appreciated by one skilled in the art. The number of input optical fibers 302 and the number of adiabatically tapered optical fibers 306 are exemplary and may be vary in other embodiments.

Heat is generally applied to fibers for a softening and tapering process. The concept of tapering relies on fiber MFD-specific behavior, that is, while the fiber is being tapered the MFD first shrinks and then expands since the waveguide becomes too weak.

Figure 3:
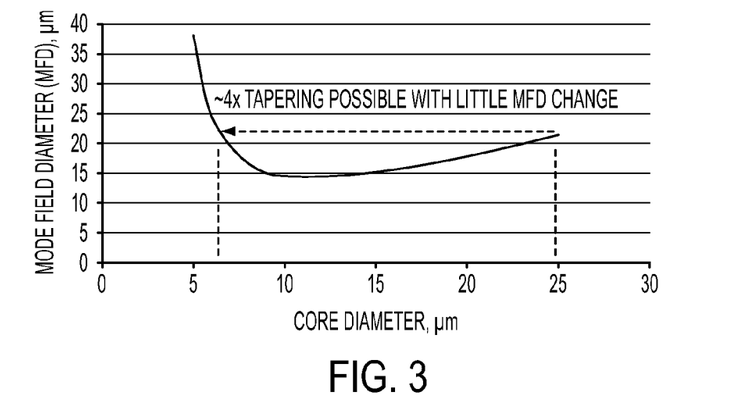
FIG. 3 illustrates a graphical representation of Mode Field Diameter (MFD) behavior in the optical fiber coupler in accordance with an embodiment of the present disclosure.

FIG. 3 illustrates a graphical representation of the fundamental-mode MFD behavior in tapered Large Mode Area (LMA) 25 μm 0.06NA core fiber as a function of the core diameter. The graph in FIG. 3 illustrates MFD in micrometers (μm) along a vertical Y-axis. On a horizontal X-axis, the graph illustrates core diameter, which is represented in micrometers (μm). The graph clearly shows that tapering by a factor of four from 25 μm to 6.5 μm results in little change in MFD. That is, as shown in FIG. 3, the MFD decreases as the core diameter is tapered gradually from 25 μm to around 12 μm. When the core diameter is further tapered from around 12 μm to around 6.5 μm, the MFD starts to increase. However, as shown in FIG. 3, tapering the core diameter by a factor of four results in little change in MFD.

Commercially available fibers and commercial equipment may be used for manufacturing a coupler of the present disclosure. For example, a Vytran® GPX-3000 fiber processing station may be used for manufacturing the coupler of the present disclosure.

In one embodiment, a cross-sectional shape of adiabatic tapered, optical fiber 306 is selected from the group consisting of a rectangular shape, an elliptical shape, a circular shape, a triangular shape, a hexagonal shape or a polygonal shape.

In one embodiment, fibers 306 of coupler 300 may have internal structure. The fibers may generally have internal structures for different purposes: polarization-preserving (PANDA type fiber and others), large MFD (leakage-channel fiber (LCF), large-pitch type fiber (LPF), photonic-crystal type fiber (PCF), and others) and others purposes. In one embodiment, fibers 306 of coupler 300 are polarization-preserving fibers, for example, PANDA type fibers. However, the structure of polarization-preserving fiber is not limited to the PANDA type fiber, and any known structured fiber may be used.

Figure 9:
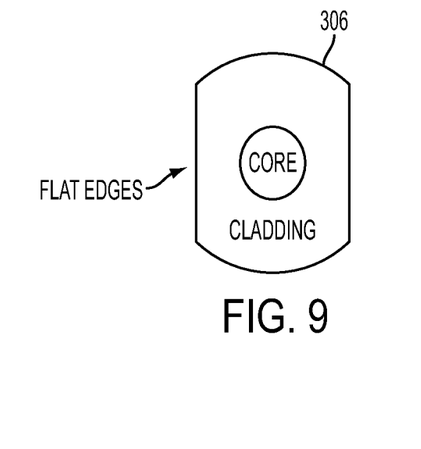
FIG. 9 shows an exemplary optical fiber of the optical fiber coupler having flat edges in accordance with an embodiment of the present disclosure.
Figure 10:
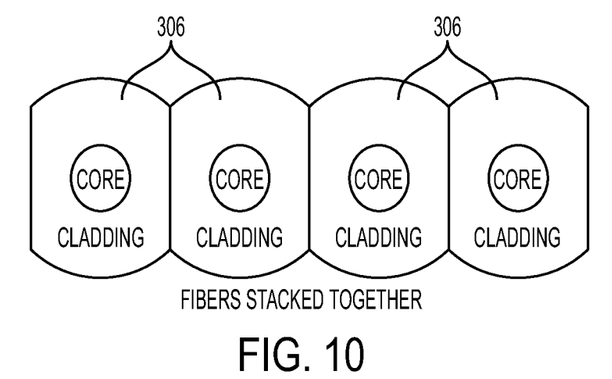
FIG. 10 shows an array of fibers with flat edges being stacked together in accordance with an embodiment of the present disclosure.

FIG. 9 shows exemplary fiber 306 of coupler 300 with polished/machined flat cladding edges, while FIG. 10 shows an exemplary linear (bundled) array of fibers 306 with flat cladding surfaces stacked together and tapered.

In one embodiment, fiber coupler 300 may be made of fibers lined up together (as shown in FIG. 10) and then fused and tapered together. That is, fiber coupler 300 is made from a tapered bundled (array) fiber arrangement. The cladding of the each of adiabatically tapered optical fibers 306 includes a flat, polished cladding surface. Such shape (i.e., with polished or machined flat cladding surfaces) and process of stacking together increases stability of tapering. That is, having fibers with flat polished cladding surfaces not only improves fiber's mechanical layout but also provides stability during the tapering process. Flat polished cladding surfaces can also improve the fill factor at input end 308 of coupler 300, so less tapering would be applied to the fibers.

After fibers are tapered to desired dimensions, the resulting tapered structure is cut at a desired location to form a suitable output surface for interfacing with the HARC fiber. A flat output surface is generally preferred for such an interface. The cut can be performed, for example, by cleaving, polishing or by some other cutting mechanism. In one embodiment, commercially available fiber cleavers, for example, Vytran® LDC-200 may be used for cleaving. In one embodiment, the cut may be performed normal to the optical axis of coupler 300 or at some angle depending on system requirements.

Once tapered array 312 is fabricated, output end 310 of array 312 is directly attached to non-circular core output optical device 304, and the light couples into non-circular core output optical device 304.

In another embodiment, once tapered array 312 is fabricated, array 312 is configured to produce non-circular core output optical beam 303 at output end 310 of array 312.

Figure 10A:
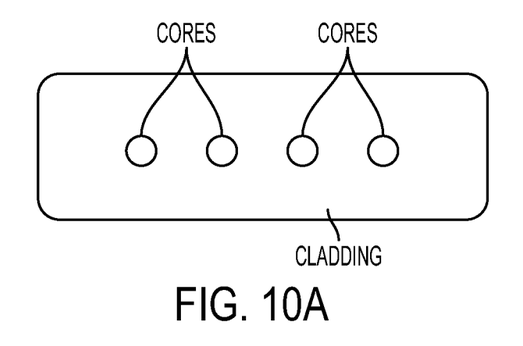
FIG. 10A shows a tapered multiple core waveguide used for coupler in accordance with an embodiment of the present disclosure and FIG. 11 shows a Planar Gradient Index Waveguide disposed between the optical fiber coupler and the non-circularly shaped core output optical device in accordance with an embodiment of the present disclosure.

In another embodiment, as noted above, fiber coupler 300 may be made using a tapered waveguide having multiple cores. FIG. 10A shows an exemplary tapered multicore waveguide arrangement that is used as fiber coupler 300 of the present application. For example, as shown in FIG. 10A, the tapered multicore waveguide may include an optical fiber having four round cores and rectangular cladding.

Cores and cladding of the tapered multicore waveguide may be rectangular-shaped, elliptical-shaped, circular-shaped, triangular-shaped, hexagonal-shaped, polygonal-shaped, or any other shaped. Fused silica or other suitable material may be used for manufacturing the tapered multicore waveguide. A fused silica waveguide having a ten-core fiber with rectangular cladding is described in detail, for example, in L. J. Cooper, P. Wang, R. B. Williams, J. K. Sahu, W. A. Clarkson, A. M. Scott and D. Jones, entitled "High-Power Yb-Doped Multicore Ribbon Fiber Laser," Optics Letters, Volume 30, No. 21, Nov. 1, 2005, which is incorporated herein by reference in its entirety.

A four-core fiber may first be manufactured and then may be tapered to obtain the tapered multicore waveguide. The tapered multicore waveguide is then cut to match the core dimensions of input fibers 302 (FIG. 2A) and desired output beam dimensions 303 (FIG. 2A).

Beam Propagation Method (BPM) modeling, performed to illustrate coupler performance (as shown in FIGS. 4A, 4B, 5, 7A, 7B, 8A, and 8B), applies both to tapered bundled fibers arrangement (as shown in FIG. 10) and tapered multicore waveguide arrangement (as shown in FIG. 10A).

In one embodiment, output optical device 304 has a non-circular core.

In one embodiment, output optical beam 303 comprises a multi-mode beam.

In one embodiment, output optical beam 303 comprises a free-space output beam.

In one embodiment, output optical device 304 is a HARC fiber. In other embodiments, output optical device 304 may be a planar waveguide. In the illustrated embodiment, as shown in FIG. 2A, output optical device 304 has a rectangular-shaped cross-sectional core.

In one embodiment, non-circularly shaped optical beam 303 or free-space coupling optics are employed to couple the signal beams from the non-circular fiber coupler 300 to the non-circular shaped output optical device 304. In such an embodiment, the non-circularly shaped optical beam 303 or free-space coupling optics are constructed and arranged to produce a beam having a size approximately the same as the core of the non-circularly shaped optical device 304.

Array 312 is directly attached to non-circularly shaped optical device 304 by bonding, gluing, fusion splicing array 312, or by other connection mechanisms. In one embodiment, output end 310 of coupler 300 is connected to 25×100 μm² 0.06NA core HARC fiber by fusion-splicing or gluing. In other embodiments, output of array 312 may exit the coupler as a free-space beam, for example, for re-imaging by lens.

Figure 4A:
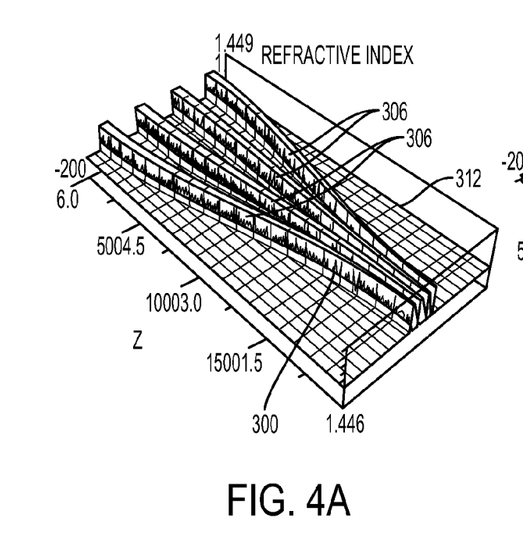
FIGS. 4A and 4B illustrate representations of refractive index and optical signal evolution along the optical fiber coupler in accordance with an embodiment of the present disclosure.
Figure 4B:
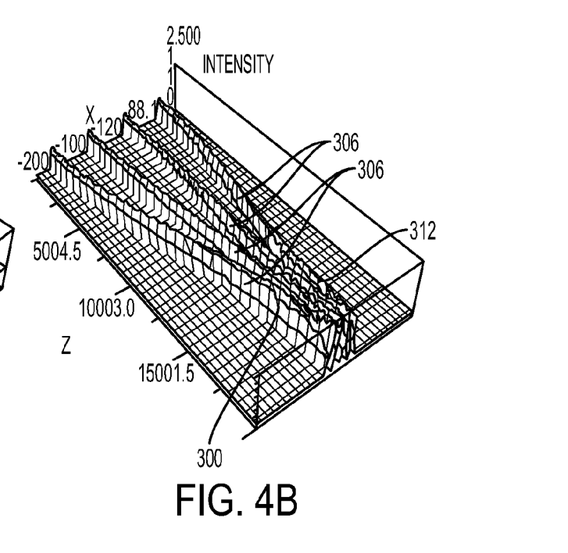

A two-dimensional modeling of coupler 300 has been performed to illustrate the principle of operation of coupler 300. A Beam Propagation Method (BPM) is used to simulate how the optical power propagates through coupler 300 of the present disclosure. The fundamental mode is excited at input end 308 of each fiber 306 in coupler 300. FIGS. 4A and 4B show representations of the refractive index and optical signal evolution along coupler 300 in accordance with one embodiment of the present invention.

Figure 5:
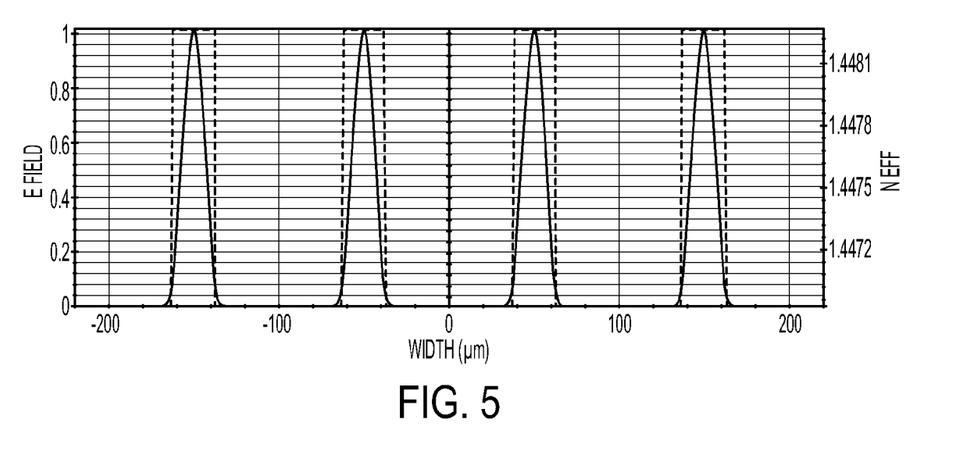
FIG. 5 illustrates a graphical representation of signal intensity distribution at an input end of the optical fiber coupler in accordance with an embodiment of the present disclosure.
Figure 6:
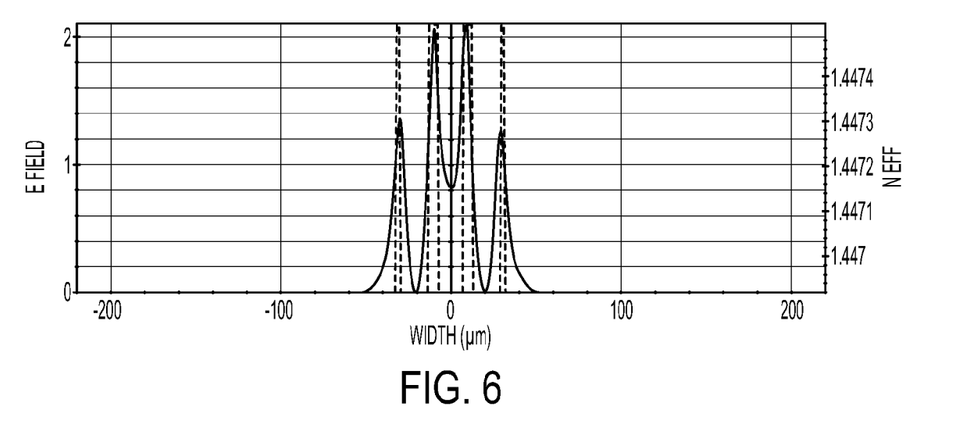
FIG. 6 illustrates a graphical representation of signal intensity distribution at an output end of the optical fiber coupler in accordance with an embodiment of the present disclosure.

FIGS. 5 and 6 illustrate graphical representations of signal intensity distributions at input end 308 and at output end 310 of optical fiber coupler 300, respectively, in accordance with an embodiment of the present disclosure. Specifically, the graphs in FIGS. 5 and 6 illustrate both the optical signal intensity (smooth curves) and refractive index profile (dashed lines) at the input end 308 (FIG. 5) and the output end 310 (FIG. 6) of optical fiber coupler 300, respectively.

The graphs in FIGS. 5 and 6 illustrate the peak intensity (i.e., normalized to 1) in arbitrary units on the left side of a vertical Y-axis and illustrate refractive index of optical fiber coupler 300 on the right side of the vertical Y-axis. On a horizontal X-axis, the graphs in FIGS. 5 and 6 illustrate the width of optical fiber coupler 300 at the input end 308 (FIG. 5) and the output end 310 (FIG. 6), which is represented in micrometers (μm).

A comparison of graphs in FIGS. 5 and 6 shows that four tapered fibers bring their respective signals close to each other. For example, the input beam occupies an area of 25×320 μm², while the output beam occupies an area of 25×100 μm². This reduction in emitting area corresponds to an increase in the brightness of the optical signal.

More specifically, FIG. 5 shows that at the input end 308, the optical signal is distributed over a dimension of approximately 320 μm, while FIG. 6 shows that at output end, the optical signal is distributed over a smaller dimension of approximately 100 μm. In the perpendicular direction (the direction perpendicular to the linear array of input fibers), the MFD does not change much and stays near diffraction-limited. Also, adiabatic tapering of coupler 300 preserves the beam quality. Thus, by using coupler 300 of the present disclosure, the brightness of input signal is increased by approximately three times without the loss of beam quality.

Figure 7A:
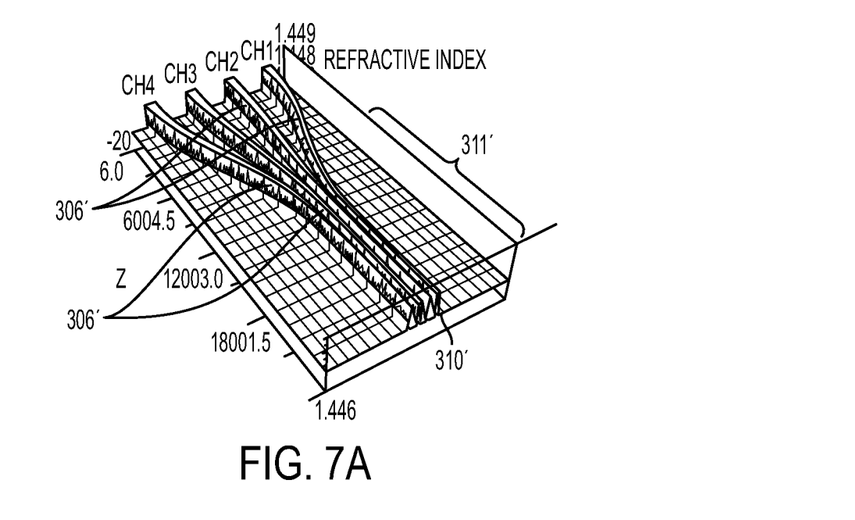
FIGS. 7A and 7B illustrate representations of refractive index and optical signal evolution along the optical fiber coupler in accordance with another embodiment of the present disclosure.
Figure 7B:
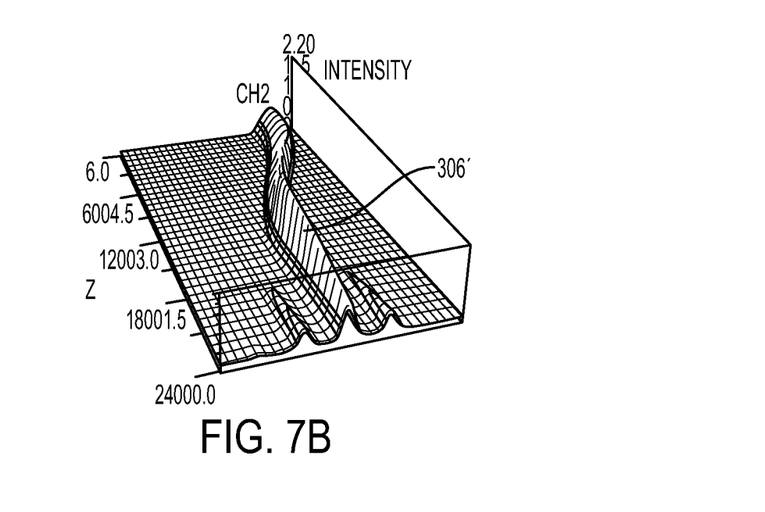

FIGS. 7A and 7B show representations of the refractive index and optical signal evolution along coupler 300', respectively, in accordance with another embodiment of the present invention. Coupler 300', shown in FIG. 7A, has four adiabatically tapered fibers 306' with extended lengths in the output region 311', in comparison with coupler 300 of the previous embodiment (shown in FIG. 4A). That is, the taper of the adiabatically tapered optical fibers 306' of coupler 300' is extended near the output portion 311' of coupler 300' adjacent to output end 310'. Coupler 300' is similar to coupler 300 of the previous embodiment except for the extended length in the output region of coupler 300'.

A two-dimensional modeling of coupler 300' has been performed to illustrate the principle of operation of coupler 300'. A Beam Propagation Method (BPM) is used to simulate how the optical power propagates through coupler 300' of the present disclosure. A signal is launched into channel 2 (of total 4 input channels). FIG. 7B shows signal evolution in the coupler 300'. As shown in FIG. 7B, the optical power couples into adjacent channels (i.e., channels 1 and 3) while propagating along coupler 300', which has a tapered extended output. Coupling depends on the fiber optical parameters and on the geometry of the taper and may be engineered for specific coupling requirements. Coupler 300' may be beneficial for the devices where inter-channel signal coupling is used, for example, in coherent beam combining.

Figure 8A:
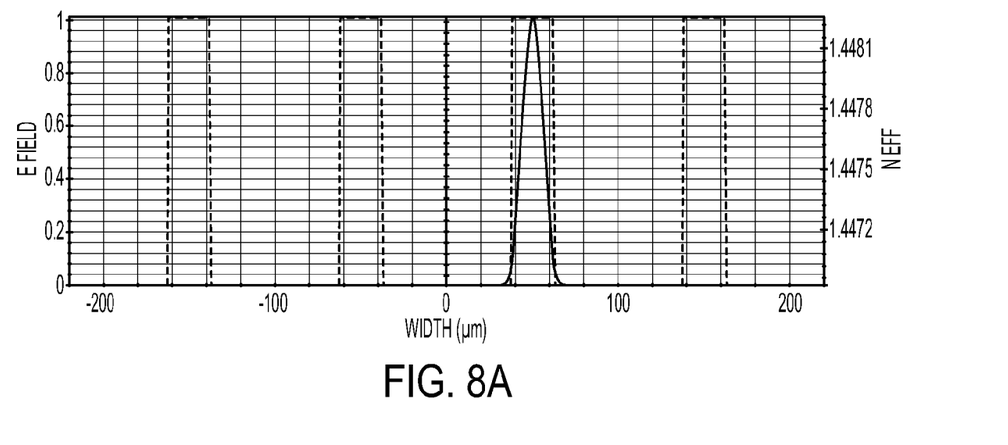
FIGS. 8A and 8B illustrate graphical representations of signal intensity distribution at an input end and an output end of the optical fiber coupler, respectively, in accordance with another embodiment of the present disclosure.
Figure 8B:
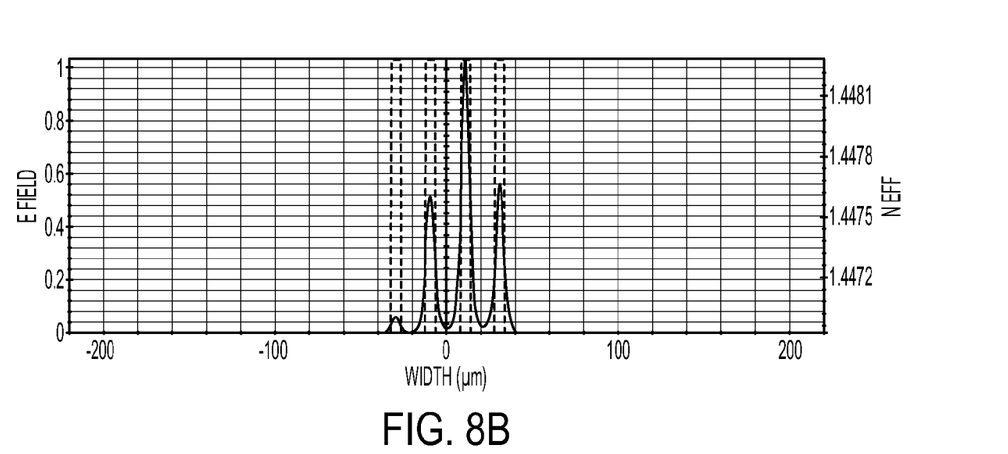

FIGS. 8A and 8B illustrate graphical representations of the signal intensity distribution at the input end 308' and output end 310' of the optical fiber coupler 300' in accordance with another embodiment of the present disclosure. Specifically, the graphs in FIGS. 8A and 8B illustrate both the optical signal intensity and refractive index profile at the input end 308' (FIG. 8A) and the output end 310' (FIG. 8B) of the optical fiber coupler 300', respectively.

The smooth curves in graphs in FIGS. 8A and 8B illustrate the peak intensity (i.e., normalized to 1) in arbitrary units on the left side of a vertical Y-axis, and the dashed lines illustrate the refractive index of optical fiber coupler 300' on the right side of the vertical Y-axis. On a horizontal X-axis, the graphs in FIGS. 8A and 8B illustrate the width of the optical fiber coupler 300' at the input end 308' (FIG. 8A) and the output end 310' (FIG. 8B), which is represented in micrometers (μm).

Both couplers 300 and 300' described in the present disclosure may be used for coupling signal from a number of fiber-coupled light sources into a HARC fiber or any other devices/applications where it is beneficial to have a non-circular beam.

Coupler 300 of the present disclosure may be used in laser beam delivery applications, e.g., high power laser beam delivery using semi-guiding high-aspect-ratio core (SHARC/HARC fiber), laser beam combining applications, and/or material processing by laser beams.

The all-fiber optical signal coupler of the present disclosure combines fiber-coupled beams into one non-circular beam in a monolithic, all-fiber format with increased brightness. The all-fiber optical signal coupler of the present disclosure also preserves the input signal beam quality while increasing the brightness. The coupler of the present disclosure employs adiabatic fiber tapering and Mode Field transformation. The coupler of the present disclosure forms a non-circular high-aspect ratio output beam matching a HARC fiber. In one direction the beam can be diffraction-limited depending on the particular coupler design. The beam may be delivered over extended distances by a HARC fiber without loss of quality and brightness.

Although the present disclosure has been described in detail for the purpose of illustration, it is to be understood that such detail is solely for that purpose and that the inventive concept is not limited to the disclosed embodiments, but, on the contrary, is intended to cover modifications and equivalent arrangements that are within the spirit and scope of the appended claims. In addition, it is to be understood that the present disclosure contemplates that, to the extent possible, one or more features of any embodiment may be combined with one or more features of any other embodiment.

What is claimed is:

1. An optical fiber coupler configured to receive signal beams from a plurality of input optical fibers to produce a non-circularly shaped output optical beam, the coupler comprising:

an adiabatically tapered optical device having one or more cores with a first core diameter, one or more claddings, and a first mode field diameter at an input end of the tapered optical device, and a second core diameter and a second mode field diameter at an output end of the tapered optical device, the tapered optical device has a core taper ratio equal to the ratio between the second core diameter and the first core diameter, and a mode taper ratio equal to the ratio between the second mode field diameter and the first mode field diameter, the tapered optical device is configured to be directly attached to the plurality of input optical fibers at the input end and to produce the non-circularly shaped output beam at the output end, wherein the mode taper ratio is greater than the core taper ratio, wherein a spacing between adjacent cores at the output end is less than a spacing between adjacent cores at the input end by approximately the core taper ratio, thereby increasing brightness of a combined output optical signal relative to the combined brightness of the plurality of input optical fibers by a factor approximately equal to the ratio of the mode taper ratio to the core taper ratio.

2. The coupler of claim 1, wherein the tapered optical device includes an adiabatically tapered multi-core waveguide.

3. The coupler of claim 2, wherein the adiabatically tapered multi-core waveguide includes a core and cladding, and wherein cross-sectional shapes of the core and the cladding of the adiabatically tapered multi-core waveguide are selected from the group consisting of a rectangular shape, an elliptical shape, a circular shape, a triangular shape, a hexagonal shape, a polygonal shape, or other shapes.

4. The coupler of claim 1, wherein the tapered optical device includes an array of adiabatically tapered optical fibers.

5. The coupler of claim 4, wherein the array of adiabatically tapered optical fibers is a linear array.

6. The coupler of claim 4, wherein the array of optical fibers is an array having a shape that differs from linear.

7. The coupler of claim 4, wherein a cross-sectional shape of each adiabatically tapered optical fiber is selected from the group consisting of a rectangular-shaped, an elliptical-shaped, a circular-shaped, a triangular-shaped, a hexagonal-shaped or a polygonal-shaped fibers, or fibers with other shapes.

8. The coupler of claim 7, wherein cladding of the each of the adiabatic tapered, optical fibers includes a flat, polished surface.

9. The coupler of claim 1, wherein the coupler comprises a fused silica material.

10. The coupler of claim 1, wherein the output optical beam comprises a multi-mode beam.

11. The coupler of claim 4, wherein the array is directly attached by bonding, gluing, using a bulkhead connector, or fusion splicing the array to the plurality of input optical fibers.

12. The coupler of claim 4, wherein tapered portion of the adiabatically tapered optical fibers is extended near an output end of the coupler.

13. The coupler of claim 1, wherein the core taper ratio is less than 1.

14. The coupler of claim 1, wherein the non-circularly shaped output optical beam is employed to couple the signal beams from the plurality of input optical fibers to a non-circular shaped output optical device.

15. The coupler of claim 14, wherein the non-circularly shaped output optical beam is constructed and arranged to produce a beam that is smaller than the non-circularly shaped optical device.

16. The coupler of claim 14, wherein the non-circularly shaped output optical device includes a HARC fiber, a planar waveguide, or other non-circularly shaped waveguides.

17. An optical fiber coupler configured to couple signal beams from a plurality of input optical fibers into a non-circularly shaped output optical device, the coupler comprising:
an adiabatically tapered optical device having one or more cores with a first core diameter, one or more claddings, and a first mode field diameter at an input end of the tapered optical device, and a second core diameter and a second mode field diameter at an output end of the tapered optical device, the tapered optical device has a core taper ratio equal to the ratio between the second core diameter and the first core diameter, and a mode taper ratio equal to the ratio between the second mode field diameter and the first mode field diameter, the tapered optical device is configured to be directly attached to the plurality of input optical fibers at the input end and to the non-circularly shaped output device at the output end,
wherein the mode taper ratio is greater than the core taper ratio,
wherein a spacing between adjacent cores at the output end is less than a spacing between adjacent cores at the input end of the tapered optical device by approximately the core taper ratio, thereby increasing brightness of a combined output optical signal relative to the combined brightness of the plurality of input optical fibers by a factor approximately equal to the ratio of the mode taper ratio to the core taper ratio.

18. The coupler of claim 17, wherein the tapered optical device includes an adiabatically tapered multi-core waveguide.

19. The coupler of claim 18, wherein the adiabatically tapered multi-core waveguide includes a core and cladding, and wherein cross-sectional shapes of the core and the cladding of the adiabatically tapered multi-core waveguide are selected from the group consisting of a rectangular shape, an elliptical shape, a circular shape, a triangular shape, a hexagonal shape, a polygonal shape, or other shapes.

20. The coupler of claim 17, wherein the non-circularly shaped output optical device includes a HARC fiber, a planar waveguide, or other non-circularly shaped waveguides.

21. The coupler of claim 17, wherein the tapered optical device includes an array of adiabatically tapered optical fibers.

22. The coupler of claim 21, wherein the array of optical fibers is a linear array.

23. The coupler of claim 21, wherein the array of optical fibers is an array having a shape that differs from linear.

24. The coupler of claim 21, wherein a cross-sectional shape of each adiabatically tapered optical fiber is selected from the group consisting of a rectangular-shaped, an elliptical-shaped, a circular-shaped, a triangular-shaped, a hexagonal-shaped or a polygonal-shaped fibers, or fibers with other shapes.

25. The coupler of claim 21, wherein cladding of the each of the adiabatic tapered, optical fibers includes a flat, polished surface.

26. The coupler of claim 17, wherein the coupler comprises a fused silica material.

27. The coupler of claim 21, wherein the array is directly attached by bonding, gluing, using a bulkhead connector, or fusion splicing the array to the plurality of input optical fibers.

28. The coupler of claim 21, wherein the array is directly attached by bonding, gluing or fusion splicing the array to the non-circularly shaped optical device.

29. The coupler of claim 21, wherein tapered portion of the adiabatically tapered optical fibers is extended near an output end of the coupler.

30. The coupler of claim 17, wherein the core taper ratio is less than 1.

31. The coupler of claim 17, further comprising a Planar Gradient Index Waveguide disposed between the output end of the tapered optical device and the non-circularly shaped output optical device to match signals from the array to a core size and a numerical aperture of the non-circularly shaped output optical device.

* * * * *